United States Patent Office 3,620,115
Patented Nov. 16, 1971

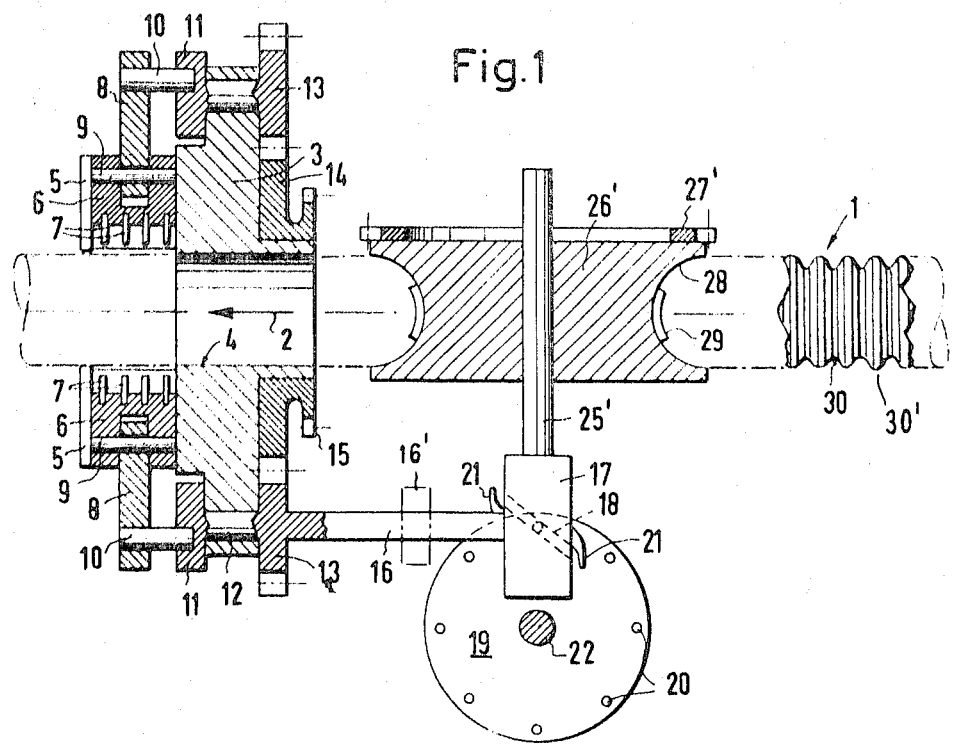
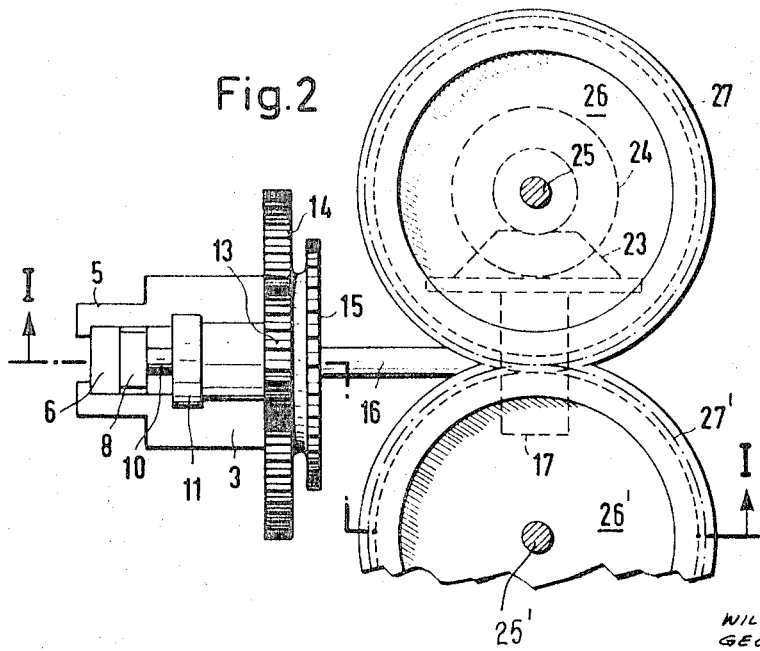

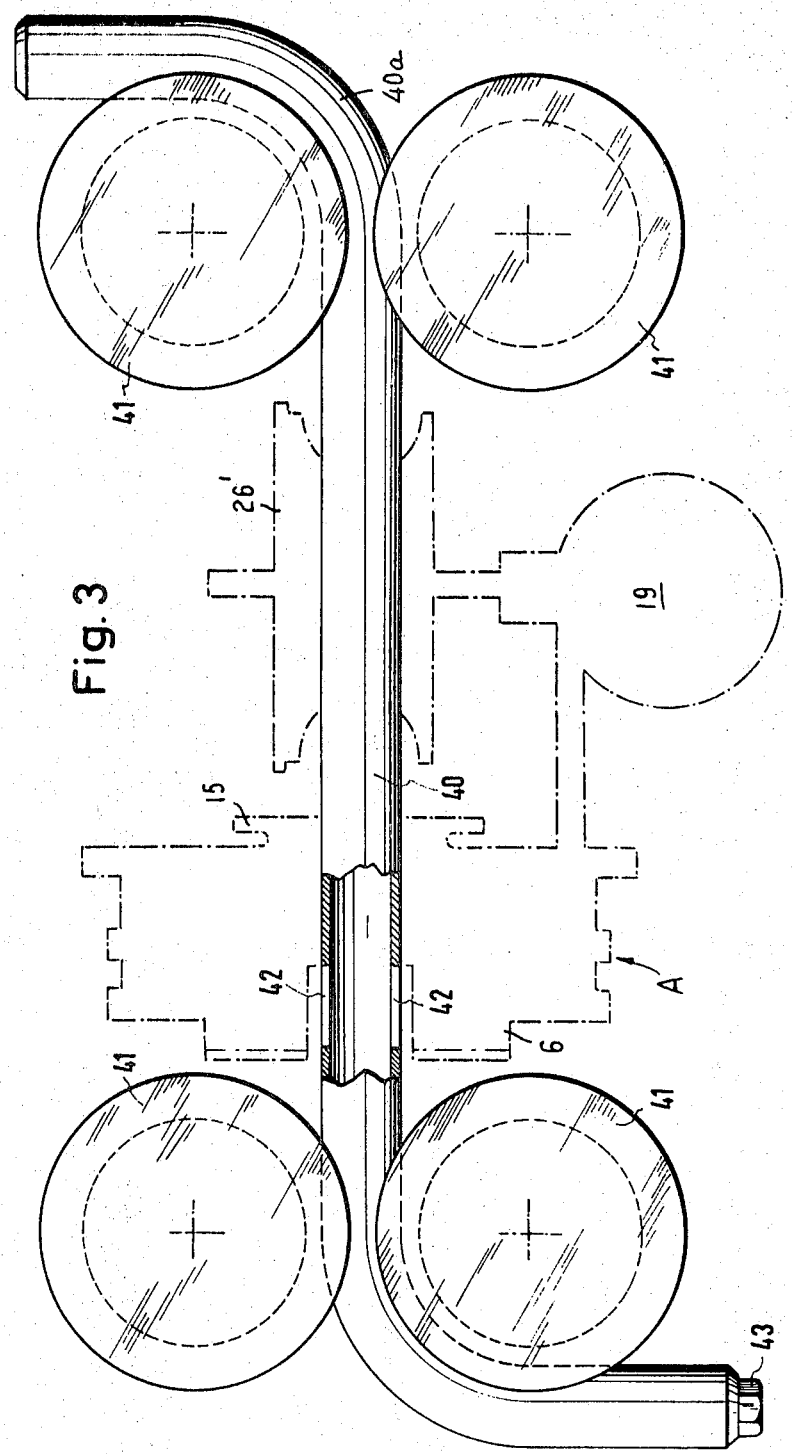

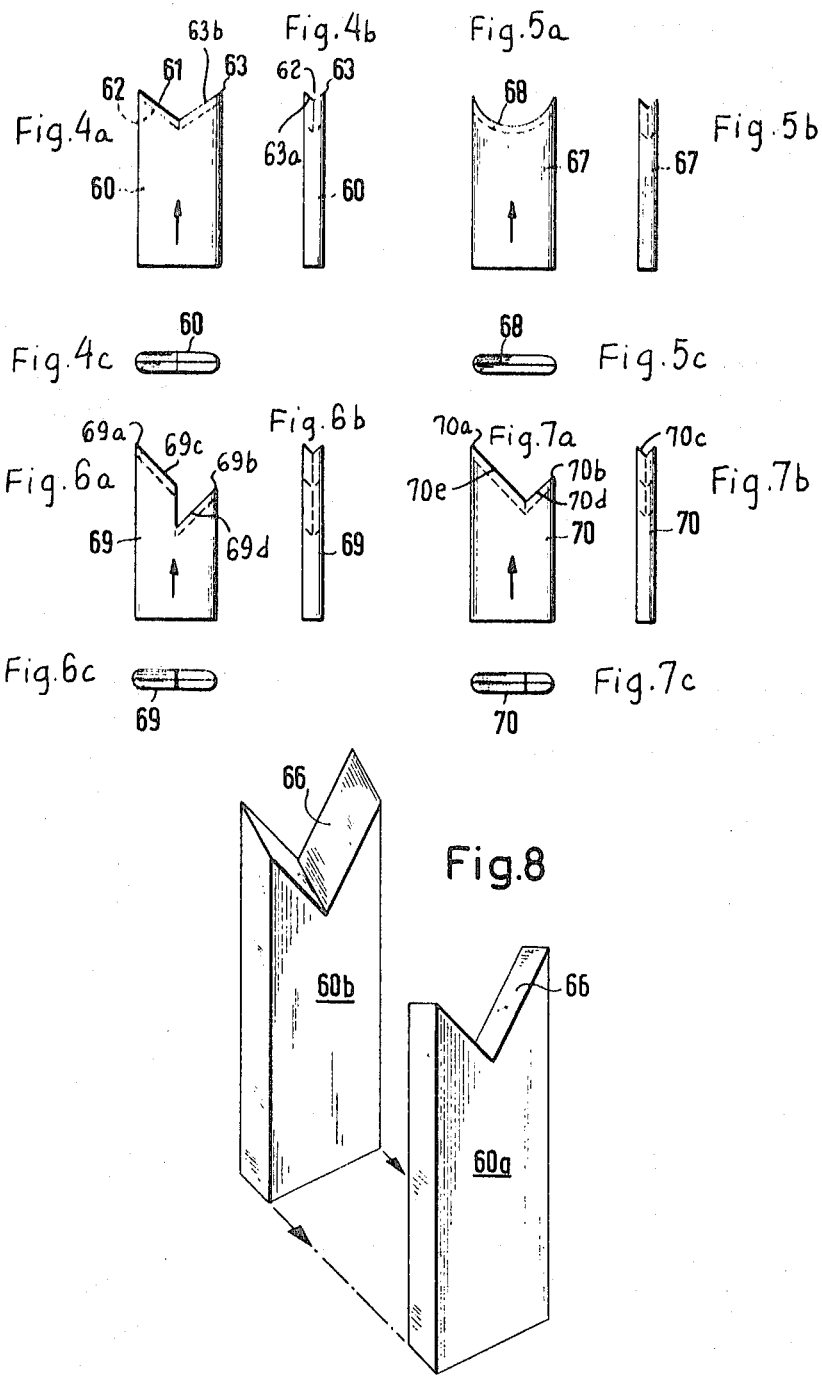

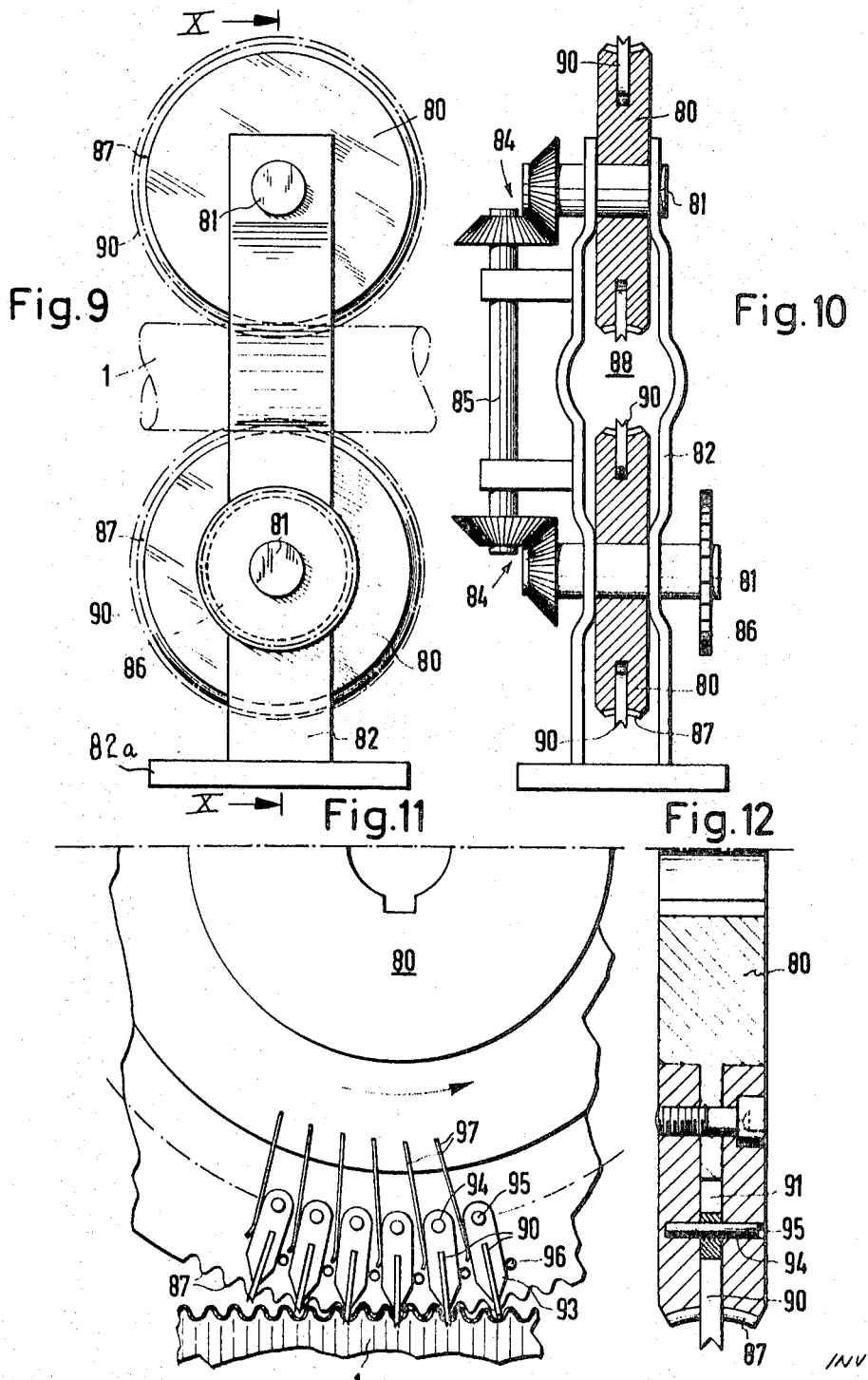

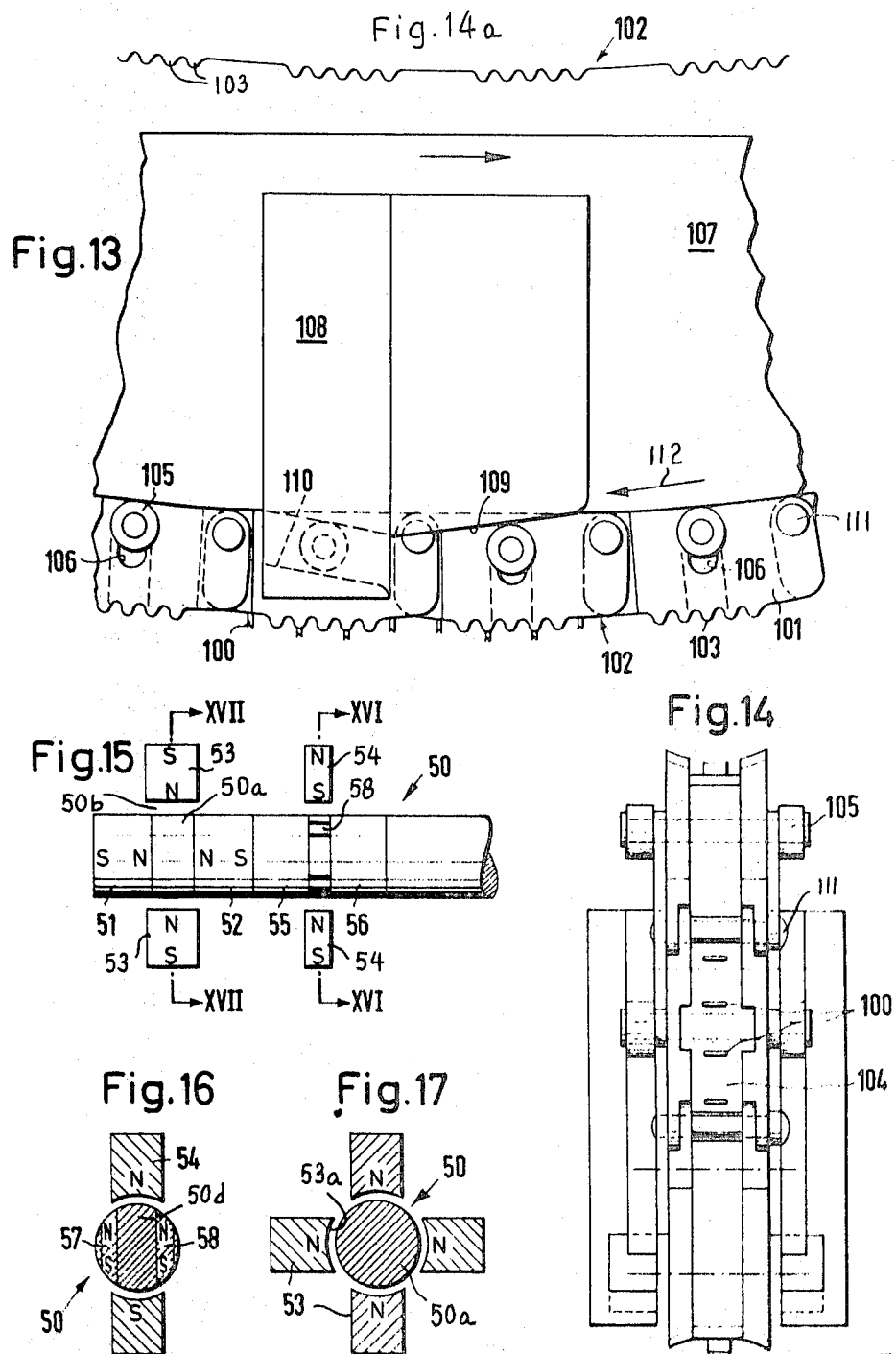

3,620,115
APPARATUS FOR MAKING PERFORATIONS IN CORRUGATED TUBES
Wilhelm Zieg, Georg Schmidt, Edgar Hauck, and Ingo Massell, Konigsberg, Bay, and Gustav Gruebel, Altershausen, Germany, assignors to Frankische Isolierrohr- und Metallwaren-Werke Gebr. Kirchner, Konigsberg, Beyern, Germany
Filed Dec. 31, 1968, Ser. No. 788,277
Claims priority, application Germany, Mar. 28, 1968, P 17 78 094.8
Int. Cl. B26d 5/22; B23d 21/00
U.S. Cl. 83—226        15 Claims

ABSTRACT OF THE DISCLOSURE

Apparatus for making perforations in helically or circumferentially corrugated plastic tubes comprises flat plate-like perforating tools which are movable radially toward and away from the tube, a feeding mechanism which advances the tube, either stepwise or continuously, and driven carriers which support the tools and are movable radially of the tube or in planes which include the axis of the tube. Each tool has a cutting edge which is flanked by receding surfaces at both sides and is provided with pronounced teeth having tips located at the same level or at different levels.

BACKGROUND OF THE INVENTION

The present invention relates to apparatus for making perforations in circumferentially or helically corrugated tubes, particularly for making perforations in thin-walled corrugated tubes which consist of synthetic thermoplastic material.

Plastic corrugated tubes are used as insulators for electric conductors and also, to an ever increasing extent, as drain pipes. In order to constitute a satisfactory drain pipe, a corrugated tube must be provided with a large number of relatively small perforations in the form of holes, slits, slots or similar openings for admission of water or other liquid. In accordance with presently prevailing practice, perforations in the wall of a corrugated plastic tube are formed by moving the tube lengthwise with reference to one or more revolving knives, preferably disk-shaped knives, which sever the corrugations to form therein slits. For example, it is known to employ four radially disposed equidistant disk-shaped knives which resemble disk saws and to advance the tube lengthwise so that the knives sever each corrugation at four equidistant points as considered in the circumferential direction of the tube. Such mode of perforating the tube is unsatisfactory, mainly because the thus formed perforations cause excessive weakening of the tube by producing the so-called notch effect. Furthermore, it is often desirable to provide the perforations between the corrugations, i.e., in such portions of the tube which define the valleys or grooves between the corrugations. The aforedescribed apparatus with disk-shaped knives are obviously unsuited for such work. Attempts to form perforations between the corrugations include the use of knives which are provided on mandrels or are installed in such a way that a corrugated tube can travel lengthwise around the mandrel and is perforated from within. Such solution are equally unsatisfactory because it is very difficult to properly mount the mandrel with knives and to properly advance the tube so that the cutting edges of knives on the mandrel may provide the inwardly corrugated portions of the tube with satisfactory perforations.

It is further known to produce a corrugated plastic tube in such a way that the portions between its corrugations are formed with radially outwardly extending hollow projections which are thereupon clipped off by a revolving knife or the like to form openings which permit entry of water when the resulting product is used as a drain pipe. However, proper mounting of a knife which orbits around a travelling corrugated tube presents many problems. Furthermore, the just mentioned hollow projections can be formed economically on tubes with helical corrugations whereas the demand for tubes with circumferentially complete corrugations often exceeds the demand for tubes with helical corrugations. Of course, the cost of corrugated tubing with hollow projections is considerably higher than that of simple helically or circumferentially corrugated tubes.

SUMMARY OF THE INVENTION

It is an object of our invention to provide an apparatus which can perforate helically or circumferentially corrugated tubes, which can perforate thin-walled or thick-walled tubes, which can form perforations in or between the corrugations of a tube, and which can form perforations while the tube advances stepwise or continuously.

Another object of the invention is to provide an apparatus which can provide a plastic corrugated tube with any desired number of perforations, which can produce perforations in the form of round, elongated or otherwise configurated openings, and which can form perforations while the tube is or is not supported from within.

A further object of the invention is to provide novel and improved perforating tools for use in the above outlined apparatus and to design the tools in such a way that they can rapidly and cleanly perforate selected portions of an intermittently or continuously moving corrugated tube.

An additional object of the invention is to provide the apparatus with novel perforating units and with novel means for moving the tube with reference to the perforating tools.

Still another object of the invention is to provide a perforating apparatus which can perforate tubes of greater or smaller diameter, of greater or lesser wall thickness and which can form perforations only in the corrugations, only between the corrugations or in as well as between the corrugations.

The apparatus of our invention is utilized for making elongated, round or otherwise configurated perforations in helically or circumferentially corrugated tubes, particularly in thin-walled tubes which consist of synthetic thermoplastic material. It comprises a feeding mechanism for advancing the tube lengthwise (either intermittently or continuously) along a predetermined path and past a perforating station, tool means comprising at least one but preferably several perforating tools which are distributed circumferentially and/or lengthwise of the tube and each of which has a front end portion provided with a cutting edge which is flanked by surfaces at least some (but preferably all) of which recede from the cutting edge toward the rear end portion of the respective tool, carrier means supporting the tool, and drive means arranged to move the carrier means so as to effect at the perforating station recurring penetration of cutting edges into longitudinally spaced portions of the tube. The cutting edges may penetrate the wall of the tube through the corrugations and/or in the valleys between corrugations.

Each cutting edge is preferably formed with several pronounced teeth having tips located at the same level or at different levels. At the present time, we prefer to employ perforating tools with elongated front end portions flanked by rounded side surfaces. The tips of teeth on the cutting edges are preferably located at both ends of the respective front end portions.

The carrier means may comprise one or more carriers which are reciprocable radially of the tube or one or more carriers which are movable in a plane including the axis of the tube. For example, the carrier means may comprise two rotary carriers which carry sets of substantially radially extending perforating tools or one or more endless chains of carriers each of which supports one or more tools. Each tool is preferably reciprocable with reference to its carrier.

If desired or necessary, the apparatus may further comprise guide means for guiding the tube along the aforementioned path and means for internally and/or externally supporting the tube at the perforating station. External supporting means will be provided if the carrier means does not completely surround the tube at the perforating station. The internal supporting means may comprise a straight or substantially S-shaped mandrel which can be held in position by magnets or in another suitable way.

The novel features which are considered as characteristic of the invention are set forth in particular in the appended claims. The improved perforating apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a longitudinal vertical sectional view of a perforating apparatus which embodies one form of our invention and is employed to make perforations between the corrugations in a circumferentially corrugated plastic tube, the section being taken in the direction of arrows as seen from the line I—I of FIG. 2;

FIG. 2 is a fragmentary top plan view of the apparatus shown in FIG. 1;

FIG. 3 is a schematic side elevational view of a modified apparatus which includes the structure of FIG. 1 and a mandrel which supports the corrugated tube from within at the severing station;

FIG. 4a is a side elevational view of a perforating tool which can be utilized in our apparatus;

FIG. 4b is an end elevational view of the perforating tool shown in FIG. 4a;

FIG. 4c is a top plan view of the perforating tool shown in FIGS. 4a and 4b;

FIG. 5a is a side elevational view of a second perforating tool;

FIG. 5b is an end elevational view of the second tool;

FIG. 5c is a top plan view of the second tool;

FIG. 6a is a side elevational view of a third perforating tool;

FIG. 6b is an end elevational view of the third tool;

FIG. 6c is a top plan view of the third tool;

FIG. 7a is a side elevational view of a fourth perforating tool;

FIG. 7b is an end elevational view of the fourth tool;

FIG. 7c is a top plan view of the fourth tool;

FIG. 8 is an enlarged perspective view of portions of the tool shown in FIGS. 4a to 4c prior to assembly;

FIG. 9 is a fragmentary side elevational view of a third apparatus wherein the carriers for perforating tools form part of the feeding means for a corrugated plastic;

FIG. 10 is a sectional view as seen in the direction of arrows from the line X—X of FIG. 9;

FIG. 11 is an enlarged view of a detail in the structure of FIG. 9;

FIG. 12 is an enlarged view of a detail in the structure of FIG. 11;

FIG. 13 is a fragmentary side elevational view of a further perforating apparatus;

FIG. 14 is a fragmentary bottom plan view of the structure shown in FIG. 13;

FIG. 14a is a schematic view of the outline of the feeding device in the apparatus of FIGS. 13 and 14;

FIG. 15 is a fragmentary view of a portion of a further apparatus which constitutes a modification of the apparatus shown in FIG. 3;

FIG. 16 is a sectional view as seen in the direction of arrows from the line XVI—XVI of FIG. 15; and FIG. 17 is a sectional view as seen in the direction of arrows from the line XVII—XVII of FIG. 15.

DESCRIPTION OF THE PREFERRED EMBODIMENTS

FIGS. 1 and 2 show certain parts of a perforating apparatus which embodies one form of our invention. The major part of the frame, the bearings, fasteners and analogous standard components were omitted for the sake of clarity. Furthermore, these illustrations show two perforating or punching units even though the apparatus can comprise a single perforating unit or three or more such units, depending on the intended use of the ultimate product. At the present time, we prefer to equip the apparatus with a relatively large number of perforating units, for example, four or six.

The workpiece 1 which is to be provided with perforations is a circumferentially corrugated tube of synthetic thermoplastic material. The arrow 2 indicates the direction in which the tube 1 is fed through the apparatus.

A frame member 3 of the apparatus is provided with a passage or channel 4 through which the tube 1 is conveyed in stepwise fashion. The frame member 3 is further provided with guides 5 for reciprocable carriers 6 each of which forms part of one of the perforating or punching units. The guides 5 confine the respective carriers to reciprocatory movement radially of the path for the tube 1. Each carrier 6 supports four perforating tools 7 and these tools are disposed in two rows extending in parallelism with the axis of the channel 4. The common central symmetry plane of the two rows of tools 7 includes the axis of the channel 4.

The drive means for moving the carriers 6 radially of the channel 4 comprises connecting rods 8 which are articulately connected to the respective carriers by pivot pins 9. The outer ends of the connecting rods 8 are mounted on eccentric pins 10 of disks 11 which are rigid with shafts 12 rotatable in the frame member 3. The shafts 12 are provided with pinions 13 which mesh with a centrally located annular gear 14 mounted on the frame member 3 and provided with a sprocket wheel 15. The sprocket wheel 15 is driven by an endless chain which is driven by a motor or the like, not shown in the drawing. The motor is preferably of the variable-speed type and rotates the gear 15 continuously so that the shafts 12 are constantly driven and effect periodically recurring radial inward and outward movements of carriers 6.

The drive for the carriers 6 (including the parts 8, 11, 13 and 14) further transmits motion to a feeding mechanism which effects stepwise movements of the tube 1 in the direction indicated by arrow 2. This feeding mechanism comprises an extension 16 of one of the shafts 12, a cylinder cam 17 mounted on the extension 16 and having a suitably inclined cam groove 18 of finite length, pin-shaped followers 20 provided on a disk 19 which is mounted on a shaft 22, hook-shaped guide elements 21 provided on the cam 17 at the ends of the groove 18, a bevel gear 23 on the shaft 22, a second bevel gear 24 meshing with the gear 23 and fixed to a shaft 25, a first advancing roller or sheave 26 on the shaft 25, and a second advancing roller or sheave 26 mounted on a shaft 25'. The rollers 26, 26' have annuli of meshing synchronizing teeth 27, 27'. The aforementioned projections 21 on the cam 17 serve to guide successive followers 20 into the groove 18 and to decelerate the followers after they leave the groove so that a follower which has left the groove 18 comes to a halt in immediate proximity of the corresponding end face of the cam 17.

It is desirable to employ relatively lightweight advancing rollers to inusre that the inertia of such rollers is rather small, i.e., that the members 26, 26' come to a halt as soon as a follower 20 leaves the groove 18 of the cam 17.

The rollers 26 and 26' are provided with circumferential grooves 28 of substantially semicircular outline. The radii of curvature of surfaces surrounding the grooves 28 approximate or equal the maximum radius of the tube 1. Arcuate motion transmitting teeth or ribs 29 are provided on the rollers 26, 26' in the deepmost zones of their grooves 28. These ribs 29 serve to enter circumferentially complete valleys or grooves 30 between the corrugations 30' of the tube 1 and to thereby transport the tube in the direction indicated by arrow 2 when one of the followers 20 travels in the channel 18. The length of ribs 29 is preferably substantially less than one-half the circumferential length of a valley 30; this insures that the ribs can readily enter and leave the adjoining valleys when the advancing rollers 26, 26' receive torque from the disk 19. In the illustrated embodiment, the length of a rib 29 approximates one-sixth of the circumferential length of a valley 30.

The operation:

The leading end of the tube 1 is introduced into the range of ribs 29 on the advancing rollers 26, 26'. When the motor which drives the sprocket wheel 15 is started, the disks 11 cause the pins 10 to orbit about the axes of the respective shafts 12 whereby the connecting rods 8 reciprocate the carriers 6 and their tools 7 with reference to the guides 5. Once the feeding mechanism moves the leading end of the tube 1 into the space between the two rows of tools 7, the tube 1 is formed with two rows of perforations in response to each inward stroke of the carriers 6. The tools 7 are mounted in such a way that they perforate the tube in the region of four successive valleys or grooves 30. Of course, it is equally within the purview of our invention to install the tools 7 in such a way that they form perforations in the corrugations 30'. Also, the number of tools 7 on each carrier 6 can be increased above or reduced below four, and one carrier 6 may support a greater number of tools than the other carrier. Still further, at least one of the carriers 6 may be provided with tools which can perforate the tube 1 in the region of at least one corrugation 30' and of at least one valley 30. The operation of the drive for the carriers 6 is synchronized with operation of the feeding mechanism in such a way that the tube 1 comes to a halt between two successive intermittent movements at the exact moment when the tools 7 register with predetermined portions of corrugations 30' and/or valleys 30. The means for adjusting the feeding mechanism with reference to the drive for the carriers 6 or vice versa may comprise an adjustable connection which can be installed in the extension 16 to allow for adjustment in angular position of the corresponding pinion 13 with reference to the cam 17 or vice versa. Such adjusting means is indicated in FIG. 1 by a phantom-line box 16' and may include two flanges which are affixed to two coaxial but relatively rotatable portions of the extension 16, and bolts or the like which can connect the flanges to each other in any one of several angular positions of one flange with reference to the other flange.

The operation of the feeding mechanism is synchronized with operation of the drive for the carriers 6 in such a way that the tube 1 is caused to advance by a step when the tools 7 are in the process of moving away from or toward the channel 4 and are sufficiently spaced from the axis of the channel to permit unimpeded forward moevment of the tube. Each angular displacement of the disk 19 corresponds to a stepwise advance of the tube 1, i.e., the tube is advanced during a fraction of each revolution of the cam 17. FIG. 1 shows the feeding mechanism in operation, i.e., one of the followers 20 is received in the groove 18 of the cam 17; therefore, the cutting edges of the tools 7 are spaced from the corrugations 30' of the tube. Since the disk 19 carries eight followers 20, the shaft 22 is rotated through 45 degrees in response to each full revolution of the extension 16. Such angular displacement of the shaft 22 can bring about the same, greater or lesser angular displacement of advancing rollers 26, 26', depending on the desired spacing between successive groups of perforations in the tube 1. When the cam 17 rotates and one of its projections 21 approaches a follower 20, such projection causes the follower to enter the respective end of the groove 18 and to thereupon rotate the disk through 45 degrees. The follower then leaves the groove 18 and is immediately braked by the other projection 21 so that it comes to rest in a position in which the next-following follower 20 is ready to be engaged by the one projection 21 during the next-following revolution of the cam 17. The intervals between successive step wise advances of the tube 1 should be long enough to permit movement of tools 7 to their radially inner-most positions (in which the tools 7 pierce the adjoining portions of the tube) and to further permit radially outward movement of tools 7 to such an extent that the tube can be moved by a step without any obstruction on the part of the tools. As can be readily understood by observing the inclination of the groove 18 with reference to the axis of the cam 17, a stepwise advance of the tube 1 merely requires a small fraction of the time required for a full revolution of the extension 16 so that the drive for the carriers 6 has ample time to advance and retract the tools 7 prior to the next-following stepwise transport of the tube.

It is clear that the apparatus of FIGS. 1 and 2 may be provided with suitable lateral backup or propping members which engage the tube 1 in the region between the two carriers 6 so as to prevent deformation of the tube during piercing by the tools 7. Such backup members are of advantage when the apparatus comprises only two carriers 6. If the number of carriers is greater, they can form a circumferentially complete annulus around the periphery of the tube 1 in the radially innermost positions of their tools 7 so that the aforementioned backup members can be dispensed with. If the apparatus comprises four carriers 6, each carrier can be installed diametrically opposite another carrier and the carriers may be equidistant from each other; this renders the backup members unnecessary even though the four carriers need not completely encircle the tube at the perforating station, i.e., in the region immediately downstream of the channel 4.

If desired, the carriers 6 can be mounted in such a way that they participate in stepwise advances of the tube 1, i.e., that the tools 7 penetrate into the tube while the latter is moved by the ribs 29. The drive for the carriers 6 then comprises means for moving the carriers in and counter to the direction indicated by arrow 2.

The mechanical drive for the carriers 6 of FIGS. 1 and 2 can be replaced by other types of drives. For example, the carriers could be reciprocated by hydraulic or pneumatic cylinder and piston assemblies, by suitable toggle mechanism, by electromagnetic drive means or others. Furthermore, the feeding mechanism of the apparatus shown in FIGS. 1 and 2 can comprise three or more advancing rollers or analogous feeding devices. The drive 16–24 for the advancing wheels 26, 26' can be replaced by other types of intermittently operating drives which may but need not derive motion from the drive means for the carriers 6.

FIG. 3 illustartes a portion of a second apparatus which is provided with a hollow mandrel or core 40 serving to support the tube from within during piercing by tools. The structure of FIG. 1 is indicated in FIG. 3 by phantom lines and is denoted by the character A. The apparatus of FIG. 3 solves the problem of employing a relatively short mandrel 40 even when the workpiece is a continuous tube or a tube of considerable length. It would be impractical to employ a mandrel whose length exceeds the length of a tube which is furnished in lengths of many yards.

The mandrel 40 "floats" in the corrugated tube, i.e., it is not positively connected to any external supporting member. As shown, the mandrel 40 is a substantially S-shaped hollow tubular body which is accommodated in a length of the corrugated tube. The external diameter of the mandrel 40 equals or approximates the internal diameter of the corrugated tube and such tube is guided by two pairs of wheels 41 which are respectively installed upstream of the advancing rollers 26, 26' and downstream of the carriers 6. The tube is slipped onto the mandrel and its leading end is moved into the range of ribs 29 on the rollers 26, 26' so that the tube is thereupon advanced stepwise in a manner as described in connection with FIGS. 1 and 2. The guide wheels 41 are provided with circumferential grooves of semicircular profile. The radii of curvature of surfaces surrounding such grooves of the wheels 41 equal or approximate the maximum radius of the tube. The end portions of the mandrel 40 are bent over at an angle of 90 degrees and the radius of curvature of end bend 40a is located on the axis of the adjoining wheel 41. In this way, the wheels 41 hold the mandrel 40 against turning and define portions of the path for travel of the tube toward the advancing rollers 26, 26' as well as away from the carriers 6.

At the perforating station (i.e., in the region between the tools 7), the mandrel 40 is provided with slits 42 for the cutting edges of the tools 7. Such slits can be replaced by rows of discrete apertures, one for each tool. As a rule, the slits 42 are somewhat larger than absolutely necessary to compensate for eventual deviations of the dimensions of tube 1 from desired dimensions. An advantage of discrete apertures as a substitute for apertures or slots 42 is that the chips or fragments of plastic material which are removed from tube 1 by the tools 7 cannot drop into the interior of the mandrel 40. Those fragments which happen to find their way into the mandrel are evacuated from time to time upon removal of a screw or plug 43 which seals one end of the hollow mandrel 40. The volume of the internal space of the mandrel 40 is so large that it can accommodate fragments which accumulate therein during perforation of a very long tube or of a series of long tubes so that the evacuation of fragments need not be repeated at frequent intervals.

FIGS. 15 to 17 illustrate another mode of supporting and centering a mandrel which is to be used in the interior of a travelling corrugated tube to support the latter from within during engagement by perforating tools. The mandrel 50 is a straight elongated rod of circular cross-sectional outline and its diameter is only slightly less than the smallest internal diameter of the tube. The mandrel is supported and centered by external electromagnets and by built-in permanent magnets. Of course, the external electromagnets can be replaced with permanent magnets, and it is also possible to connect the mandrel with a source of electrical energy so that it can carry or embody one or more electromagnets.

As shown in FIG. 15, the mandrel 50 is provided with two permanent magnets 51, 52 which are spaced from each other in axial direction of the mandrel and whose equal poles face each other. In FIG. 15, the north pole of the magnet 51 faces the north pole of the magnet 52. Four electromagnets 53 are disposed around the mandrel 50 in such a way that their concave faces 53a define with the cylindrical peripheral surface of the mandrel an interrupted annular gap 50b which is wide enough to permit unobstructed passage of a corrugated tube not shown. The electromagnets 53 surround a portion 50a of diamagnetic material which forms part of the mandrel 50 and is located between the permanent magnets 51, 52. Similar poles of all four electromagnets 53 face the peripheral surface of the mandrel 50, namely, the peripheral surface of the diamagnetic portion 50a. The electromagnets 53 thus cooperate with the permanent magnets 51, 52 to hold the mandrel 50 against axial and against at least some angular movement. They also insure that the mandrel is properly centered so that the width of the gap 50b is substantially constant all the way around the peripheral surface of the diamagnetic portion 50a. The length of electromagnets 53 (as considered in the axial direction of the mandrel 50) exceeds the length of the diamagnetic portion 50a; this insures that the magnetic field produces a substantial retaining force which locates and centers the mandrel in illustrated position without any axial or other displacement of the mandrel.

The means for further preventing angular displacements of the mandrel about its own axis includes the structure which is shown in FIG. 16 and in the right-hand portion of FIG. 15. Such means includes two additional external electromagnets 54 which are located diametrically opposite each other. The unequal poles of the electromagnets 54 face each other, i.e., the peripheral surface of the mandrel. The latter comprises two diamagnetic portions 55, 56 which are spaced axially from each other and flank two permanent magnets 57, 58 which are incorporated in the mandrel 50 and extend at right angles to its axis. This is shown in FIG. 16. The north poles of the permanent magnets 57, 58 face the north pole of the upper electromagnet 54 and their south poles face the south pole of the lower electromagnet 54. It will be readily understood that the structure shown in FIG. 16 offers substantial resistance to rotation of the mandrel 50 about its own axis. Any angular displacement of the mandrel from the position shown in FIG. 16 produces ever increasing restoring forces which tend to return the mandrel to illustrated position. The retaining force is further enhanced due to the fact that the length of electromagnets 54 (as considered in the circumferential direction of the mandrel 50) exceeds the circumferential length of the diamagnetic portion 50d between the permanent magnets 57, 58.

Certain presently preferred forms of perforating tools are illustrated in FIGS. 4a to 7c. The shape of perforating tools is of considerable importance because it influences the quality of perforating action and the speed at which the apparatus can perforate a circumferentially or helically corrugated plastic tube. The tool 60 of FIGS. 4a to 4c resembles a flat plate of substantially rectangular cross-sectional outline but with four rounded corners so that its narrower side surfaces are of semicircular outline. This is shown in FIG. 4c. Such configuration of side surfaces prolongs the useful life of the tool. The end face 61 on the front end portion of the tool 60 (namely, that end face which is formed with a cutting edge and is first to come in contact with the tube) is formed with a longitudinally extending substantially V-shaped groove 62 comprising two halves which are inclined with reference to each other and meet in the central symmetry plane of the tool 60 substantially midway between the two rounded narrower side surfaces. It can be said that the end face 61 has a negative roof-shaped profile. This end face 61 defines a circumferentially extending cutting edge and the material of the tool 60 is recessed inwardly all the way along the inner and outer sides of the cutting edge. If one visualizes the external surface of the tool 60 in developed form, the cutting edge of the end face 61 is formed with four saw teeth each having a tip 63, a shorter flank 63a at one side of the tip 63, and a longer flank 63b at the other side of the tip. When the tool 60 is caused to penetrate into the wall of a plastic tube, it moves in the direction indicated by arrow so that the tips 63 penetrate into the plastic material ahead of the flanks 63a, 63b. When the penetration progresses so that the entire cutting edge passes through the tube and forms a circumferentially complete surface around the resulting perforation (which is an elongated slot in the valley 30' of the tube), the material which is thereby removed by the tool remains entrapped within the confines of the cutting edge and can be normally withdrawn from the tube to leave the central depression of the end face 61 during the interval between two successive perforating steps. Furthermore, such configuration of the cutting edge insures that the material which is removed to form a perforation does not adhere to the tube along one or more webs. Complete separation of the material which is severed to form a perforation is desirable because such material would reduce the volume of the plastic tube and because it could clog the perforations to reduce the rate of inflow of liquid when the ultimate product is used as a drain pipe.

The manner in which the tool 60 of FIGS. 4a–4c can be produced is illustrated in FIG. 8. The tool is assembled of two thin plates or halves 60a, 60b the end faces at the front end portions of which are formed with V-shaped cutouts 66 which slant inwardly toward each other to insure the formation of the aforementioned groove 61 when the plates 60a, 60b are thereupon moved toward each other in the direction indicated by arrows to be united by soldering, welding, by resorting to an adhesive, to rivets or in another suitable way. It is not even necessary to establish a firm connection between the plates 60a, 60b, i.e., they can be simply placed against each other and mounted in a carrier so that they form a tool 60.

FIGS. 5a to 5c illustrate a second tool 67 which is similar to the tool 60 with the sole exception that the profile of the end face 68 on the front end portion is of substantially semicircular outline. Thus, the transition between the longer tooth flanks of the cutting edge is gradual so that two such larger tooth flanks form a substantially semicircular portion of the cutting edge.

FIGS. 6a to 6c illustrate a further tool 69 wherein the end face of the front end portion is formed with a cutting edge comprising two sets of teeth which are offset as considered in the direction of penetration of tool 69 into the wall of a corrugated tube. Thus, the tips 69a at the left-hand side of the tool 69 (as viewed in FIG. 6a) penetrate into the plastic material prior to right-hand tips 69b. This results in more satisfactory distribution of stresses during penetration of a tool into plastic material. The tips 69b are located at the level of the innermost or rearmost portions of longer flanks 69c. Thus, the severing action of flanks 69c is substantially completed when the severing action of the flanks 69d begins. Such types of tools have been found to be very satisfactory for use in our apparatus. The tool 69, as well as the tool 67, can be assembled of two plate-like halves substantially in the same way as described in connection with FIG. 8.

Another advantageous tool 70 is shown in FIGS. 7a to 7c. This tool is also similar to the tool 60 of FIGS. 4a–4c with the exception that the cutting edge comprises two sets of tips 70a, 70b located at different levels and three sets of flanks 70c, 70d, 70e. The flanks 70d are longer than the flanks 70c but shorter than the flanks 70e. In other words, the profile of the end face on the front end portion of the tool 70 is irregular because it has a V-shaped outline with a shorter leg and a longer leg. Such configuration insures that the tips 70a penetrate into the wall of a plastic tube ahead of the tips 70b and that the cutting action of longest flanks 70e is halfway completed when the flanks 70d begin their severing action.

The perforating tools preferably consist of high-quality wear-resistant steel. Such tools are rather small because, as a rule, the diameter of a round or substantially round perforation in a corrugated tube which is to be used as a drain pipe need not exceed a few millimeters. Therefore, we prefer at this time to assemble each perforating tool of several portions because it is easier to properly shape the cutting edges on individual portions than to grind the cutting edges on a solid one-piece tool.

The apparatus of FIGS. 9 to 12 includes a feeding mechanism which is combined with the punching or perforating units. This apparatus comprises two disk- or wheel-shaped carriers 80 which are affixed to parallel shafts 81 extending at right angles to and crossing in space the path of the corrugated tube 1. The shafts 81 are mounted in frame members or brackets 82 which are affixed to a stationary support 82a. The shafts 81 carry bevel gears which form part of two bevel gear drives 84 each of which includes a second bevel gear mounted on a shaft 85. The bevel gear on one of the shafts 81 is driven by a sprocket wheel 86 which is rotated by a chain, not shown, the latter deriving motion from a second sprocket wheel which is driven by a variable-speed motor or another suitable prime mover. The just described drive insures that the carriers 80 rotate at the same speed but in opposite directions. The path 88 for the corrugated tube 1 extends between the carriers 80. The circumferential grooves of these carriers accommodate motion transmitting ribs 87 which enter the valleys between the corrugations of the tube 1 and advance the latter lengthwise in response to rotation of the sprocket wheel 86. The carriers 80 support perforating tools 90 which provide the tube 1 with perforations in automatic response to forward movement of the tube along the path 88. As shown in FIGS. 11 and 12, each carrier 80 supports a set of equidistant substantially radially extending tools 90 which are installed in a relatively deep circumferential groove 91 extending inwardly from the aforementioned shallower groove for the ribs 87. Each tool 90 is preferably shaped and assembled in a manner as described in connection with FIGS. 4a–4c and 8. Thus, each such tool may comprise two halves in the form of highly polished hardened thin steel plates which together define a substantially annular cutting edge with four tips. Each tool 90 is installed in a holder 93 and is secured thereto by rivets or the like. The inner end portions of holders 93 are formed with axially parallel holes or bores 94 for pivot pins 95 so that each thereof can pivot in the plane of the respective carrier 80 between two spaced stops or abutments 96 (see particularly FIG. 11). The pins 95 are adjacent to the rear end portions of the respective tools 90. Leaf springs 97 or analogous biasing means are provided to urge each holder 93 against one of the adjoining stops 96, namely, into abutment with the leading stop 96 as considered in the direction of rotation of carriers 80.

When the apparatus of FIGS. 8–12 is in use, the carrier 80 of FIG. 11 rotates in a counterclockwise direction and, when a tool 90 does not engage the wall of the corrugated tube 1, its holder 93 abuts against the right-hand stop 96 because it is urged in a counterclockwise direction under the action of the respective leaf spring 97. The ribs 87 of the carrier 80 cause the tube 1 to advance in a direction to the right, as viewed in FIG. 11. The purpose of swingable or pivotable holders 93 is to compensate for eventual inaccuracies in feed of the tube 1 as well as for eventual deviations of the shape of tube 1 from a desired shape. Thus, when the ribs 87 transport the tube 1 lengthwise, the front end faces of successive tools 90 penetrate into adjoining valleys and engage the wall of the tube. The tube then causes the tools 90 to pivot with their holders 93 about the respective pins 95 before or while the cutting edges of tools penetrate into the plastic material to form therein perforations of elongated or other desired shape. The springs 97 yield when the holders 93 pivot and thereby compensate for eventual variations in elasticity and deformability of the wall of corrugated tube as well as for eventual fluctuations in forward speed of the tube.

The apparatus of FIGS. 9–12 may comprise a single carrier 80 or three or more carriers. If a single carrier is used (i.e., if the tube 1 is to be provided with a single row of perforations), the apparatus preferably comprises a carrier 80 and an advancing roller, such as the roller 26 or 26' of FIG. 1, whose ribs cooperate with the ribs 87 to insure satisfactory transport of the tube. It is further clear that the tools 90 and ribs 87 can be provided on an endless chain which is trained over an endless conveyor corresponding to one of the carriers 80.

In accordance with a modification which is not shown in the drawing, the tools 90 of the apparatus shown in FIGS. 9–12 can be mounted for radial movement with reference to their carriers 80. Suitable springs are provided to bias the tools radially inwardly and cams, plungers or like displacing devices are employed to move the tools radially outwardly at the exact moment when the tools are substantially normal to the adjoining portions of the corrugated tube. Such mounting of tools insures highly satisfactory penetration into and withdrawal of cutting edges from the wall of the tube.

It is equally possible to provide the apparatus of FIGS. 9–12 or an analgous perforating apparatus with tools which are controlled by parallel mechanism so that the axes of tools remain normal to the tube during penetration and during withdrawal of their cutting edges. Such parallel mechanisms may comprise pairs of identical rings which rotate in synchronism about parallel axes in a manner as known from certain types of agricultural machines. The rear end of a tool is affixed to one of the rings and its front end to the other ring. The eccentricity of the rings is selected in such a way that the axis of the tool is always normal to the direction of movement of the corrugated tube. A slight drawback of such apparatus is that it must employ rather large rings in order to insure that the difference between the forward speed of the tube and the component of speed of the tool in the direction of movement of the tube is negligibly small.

Referring finally to FIGS. 13 and 14, there is shown a portion of a further apparatus wherein the feeding mechanism travels together with the perforating tools. The tools 100 are movably mounted in block-shaped links 101 which are connected to each other to form an endless chain 102. The links 101 are provided with motion transmitting ribs 103 which engage the plastic tube between its corrugations and transport it lengthwise whereby the tools 100 automatically penetrate the wall of the tube when the chain 102 is set in motion. It is clear that the apparatus of FIGS. 13 and 14 may comprise two or more chains so that the tube can be provided with a desired number of perforations. The chain 102 is driven by sprocket wheels or the like, not shown, and its links or 101 travel along a stationary frame member 107. Each link 101 is hollow and accommodates a reciprocable carrier 104 which is supportingly and preferably rigidly connected with the corresponding set of tools 100. The carriers 104 have pairs of roller followers 105 whose shafts extend through elongated slots 106 provided in the corresponding links 101 and which can track the roof-shaped face 109 of a cam 108 affixed to the frame member 107 at the perforating station. That portion of the plastic tube (not shown) which is transported at a level below the chain 102 shown in FIG. 13 is perforated by those tools 100 which are moved downwardly in response to travel of corresponding roller followers along the face 109 of the cam 108 whereby the cutting edges of the tools gradually penetrate into and are gradually withdrawn from the wall of the tube. It is clear that the apparatus of FIGS. 13 and 14 may also be provided with a floating mandrel which supports the tube from within during travel past the perforating station.

FIG. 14a shows the outline of a portion of the chain 102. It will be seen that the motion transmitting ribs 103 are arranged in groups and that such ribs are not provided in regions where the adjoining links 101 are articulately coupled to each other by means of bolts 111 or analogous coupling elements. The numeral 110 denotes in FIG. 13 a channel in which the followers 105 travel during withdrawal of corresponding tools 100 from the wall of the plastic tube. This channel 110 is formed in the cam 108 adjacent to the upwardly sloping downstream part of the cam face 109, i.e., along the left-hand part of the cam face as viewed in FIG. 13. It is assumed that the chain 102 travels in a direction from the right to the left as indicated by the arrow 112.

If the apparatus of FIGS. 13–14 (or any one of the previously described apparatus) is installed immediately downstream of the station where the corrugated plastic tube is formed, the mandrel which is used in the production of the tube can also serve as a means for internally supporting the tube during travel past the perforating station. One mode of producing plastic corrugated tubes is disclosed in Patent No. 3,243,850 to Zieg.

The apparatus of FIGS. 13 and 14 is somewhat similar to apparatus which are disclosed in German Utility Model No. 1,808,897 and French Patent No. 1,229,321 for the production of corrugated tubes. Its carriers 104 are preferably biased by springs which urge the roller followers 105 against the face 109 of the cam 108 during travel past the perforating station. It is equally possible to mount the carriers 104 in such a way that they are permanently biased outwardly, i.e., to move the corresponding tools 100 to extended positions. The apparatus then comprises one or more cams or analogous means for retracting the tools immediately prior and subsequent to penetration of cutting edges into the wall of a tube. The cams can release the carriers suddenly so that the cutting edges of tools are propelled into the wall of the tube. Such abrupt penetration of cutting edges often insures the formation of sharply defined perforations. The tools are invariably retracted before the corresponding carriers 104 move to their innermost positions, i.e., closest to the axis of the travelling tube. From then on, the tools can be expelled either gradually or abruptly, depending on the type of tube and certain other factors.

Finally, it is equally possible to provide the apparatus with suitable devices which can correct the configuration of slightly deformed corrugations or valleys on a plastic tube immediately prior to a perforating step. For example, the apparatus may comprise shaping members which engage the tube immediately prior to penetration of a set of tools into the wall of the tube and which have tube-engaging surfaces whose configuration is complementary to that of the adjoining portion of the tube so that such surfaces eliminate at least some defects in the configuration of corrugations and/or valleys prior to the formation of openings. Such shaping members thereby insure that the perforations are formed in predetermined regions of corrugations and/or valleys and also that the tube can more readily withstand the streses which arise during penetration of cutting edges into and through its wall.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims:

1. Apparatus for making perforations in corrugated tubes, particularly in thin-walled tubes of synthetic plastic material, comprising a feeding mechanism for advancing a corrugated tube lengthwise past a perforating station and including a pair of advancing rollers having peripheral projections which engage the tube between corrugations thereof; tool means comprising at least one perforating tool including a front end portion provided with a cutting edge flanked by surfaces at least some of which recede from said cutting edge; carrier means supporting said tool; first drive means arranged to move said carrier means so as to effect at said station a recurring penetration of said cutting edge into longitudinally spaced portions of the tube; and second drive means for rotating said advancing rollers in synchronism with operation of said first drive means.

2. Apparatus as defined in claim 1, wherein the cutting edge of said front end portion is toothed.

3. Apparatus as defined in claim 1; further comprising a peripheral surface surrounding said cutting edge and also receding rearwardly therefrom.

4. Apparatus as defined in claim 1, wherein said front end portion is of elongated cross-section and said cutting edge comprises teeth having tips located at both ends of said cross-section.

5. Apparatus as defined in claim 1, wherein said front end portion is of elongated rectangular outline with rounded side surfaces and wherein said cutting edge recedes from said side surfaces toward the center of said front end portion.

6. Apparatus as defined in claim 1, wherein said front end portion has a negative roof-shaped profile.

7. Apparatus as defined in claim 1, wherein said cutting edge comprises teeth having tips located at different levels.

8. Apparatus as defined in claim 1, wherein said tool means comprises a plurality of perforating tools spaced from each other in the circumferential direction of the tube.

9. Apparatus as defined in claim 1, wherein said tool means comprises a plurality of perforating tools spaced from each other in the longitudinal direction of the tube.

10. Apparatus as defined in claim 1, said first and second drive means operating intermittently.

11. Apparatus as defined in claim 10, wherein said carrier means is arranged to move said tool substantially radially of the tube, at least while said cutting edge penetrates into and is withdrawn from the tube.

12. Apparatus as defined in claim 10, wherein said first mentioned drive means is arranged to reciprocate said carrier means and said tool radially of the tube.

13. Apparatus as defined in claim 12, wherein said feeding mechanism is arranged to move the tube along a predetermined path which extends through said station and wherein said first drive means comprises rotary eccentric means for reciprocating said carrier means, said carrier means being located intermediate said eccentric means and said path.

14. Apparatus as defined in claim 13, wherein said first drive means further comprises gear means for rotating said eccentric means about an axis which is parallel with said path.

15. Apparatus as defined in claim 1, wherein said carrier means is located externally of the tube.

References Cited

UNITED STATES PATENTS

| | | | |
|---|---|---|---|
| 395,320 | 1/1889 | Fish | 83—689 X |
| 1,574,159 | 2/1926 | Larkin | 83—689 X |
| 114,446 | 5/1871 | Kenney | 83—660 |
| 478,511 | 7/1892 | Janssen | 83—226 |
| 1,398,320 | 11/1921 | Dunsworth | 83—183 X |
| 2,010,009 | 8/1935 | Brightwell | 83—660 X |
| 2,326,536 | 8/1943 | Hartsock et al. | 83—193 X |
| 3,089,368 | 5/1963 | Cousino | 83—183 X |
| 3,266,352 | 8/1966 | Kuts | 83—54 X |
| 3,434,907 | 3/1969 | Philippi et al. | 83—660 X |

FOREIGN PATENTS

| | | | |
|---|---|---|---|
| 592,179 | 4/1925 | France | 83—689 |
| 30,663 | 4/1926 | France | 83—689 |
| 856,084 | 5/1940 | France | 83—689 |

FRANK T. YOST, Primary Examiner

U.S. Cl. X.R.

83—54, 193, 278, 660, 689